Dec. 22, 1959   S. E. HAUG   2,917,935
PULLEY
Filed May 29, 1958

INVENTOR.
Samuel E. Haug
BY Victor J. Evans & Co.
ATTORNEYS

United States Patent Office 2,917,935
Patented Dec. 22, 1959

2,917,935
PULLEY

Samuel E. Haug, Fort Morgan, Colo., assignor to Forney Generators, Inc., Fort Morgan, Colo.

Application May 29, 1958, Serial No. 738,756

4 Claims. (Cl. 74—230.01)

This invention relates to a pulley construction.

The object of the invention is to provide a pulley construction which includes a pair of separate pulley members that are connected to a single shaft, so that power can be conveniently supplied to any desired location or purpose.

Another object of the invention is to provide a means for mounting an auxiliary pulley adjacent to a regular pulley so that power can be provided for operating various types of equipment or accessories, and wherein the pulley arrangement of the present invention is especially suitable and useful with an electrical generator such as a generator mounted on a motor vehicle.

A further object of the invention is to provide a pulley which is extremely simple and inexpensive to manufacture.

Other objects and advantages will be apparent during the course of the following description.

In the accompanying drawings, forming a part of this application, and in which like numerals are used to designate like parts throughout the same:

Figure 1:
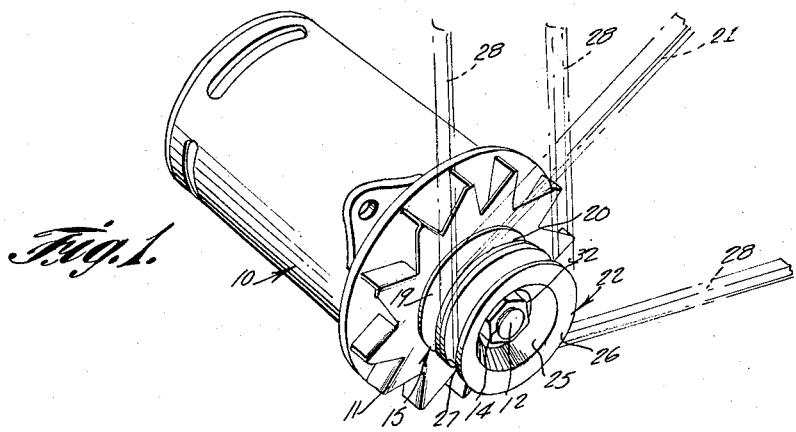
Figure 1 is a perspective view illustrating the pulley assembly of the present invention.
Figure 2:
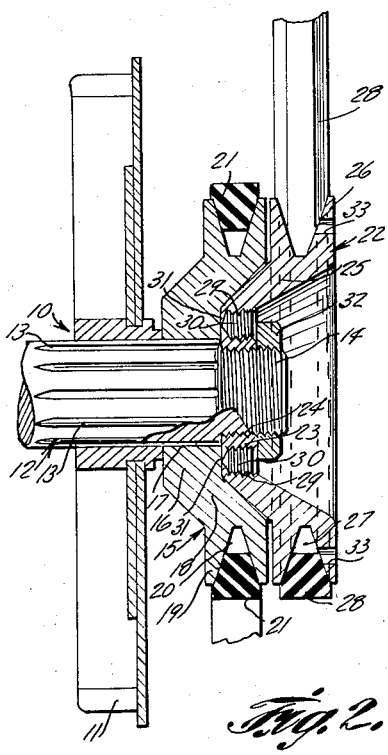
Figure 2 is a fragmentary sectional view illustrating the assembly of Figure 1.
Figure 3:
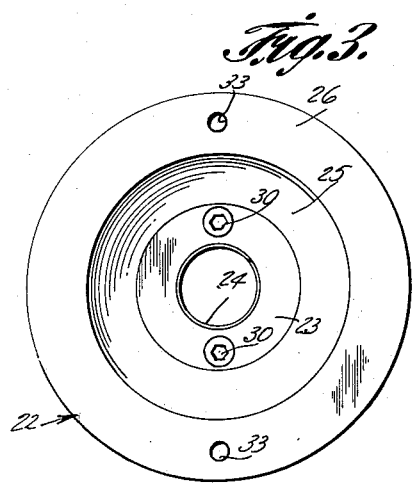
Figure 3 is an end elevational view illustrating the auxiliary pulley.

Referring in detail to the drawings, the numeral 10 indicates a portion of a generator such as a generator operated by a vehicle engine, and the generator 10 includes the usual fan 11 and shaft 12 which may be splined as at 13 so as to prevent the fan and pulley from slipping. An end portion of the shaft 12 is threaded as at 14, Figure 2.

The numeral 15 indicates a first pulley which includes a hub portion or first portion 16 that is provided with a central opening 17 for the projection therethrough of the shaft 12. The pulley 15 further includes an offset or inclined second portion 18 which terminates in an outer third portion 19, and the third portion 19 is provided with an annular groove 20, there being an endless belt 21 arranged in engagement with the groove 20.

There is further provided a second pulley which is indicated generally by the numeral 22, and the pulley 22 has substantially the same shape and configuration as the first pulley 15 and the pulleys 15 and 22 are arranged in side-by-side relation with respect to each other. Thus, the second pulley 22 includes a first section 23 which has a central threaded opening 24 that is arranged in threaded engagement with the end portion 14 of the shaft 12. The pulley 22 further includes an offset or inclined second section 25 which terminates in an outer third section 26. The third section 26 is provided with an annular groove 27, and an endless belt 28 is arranged in engagement with the groove 27.

The first section 23 of the pulley 22 is provided with a plurality of spaced apart threaded apertures 29, and a securing element 30 is arranged in threaded engagement with each aperture 29, the inner ends of the securing elements 30 being pointed as at 31 for engagement with the first portion 16 of the pulley 15. The numeral 32 indicates a jam nut which is arranged in threaded engagement with the portion 14 of the shaft 12. As shown in the drawings, the third section 26 of the pulley 22 is provided with a plurality of spaced apart holes or openings 33 whereby a tool such as a spanner wrench can be arranged in engagement with the holes 33 so as to facilitate rotation of the pulley 22.

From the foregoing, it is apparent that there has been provided a pulley construction wherein a novel and unique means is provided for attaching a pair of pulleys to a single shaft such as the shaft 12. According to the drawings, there is illustrated a generator 10 which includes the shaft 12 that has a first pulley 15 connected thereto, and the pulley 15 has a belt 21 arranged in engagement therewith. There is provided a second or auxiliary pulley 22 which includes the section 23 that has the opening 24 that threadedly engages the threaded end portion 14 of the shaft 12. The jam nut 32 helps retain the pulley 22 on the shaft 12, and the securing elements 30 have their pointed ends 31 engaging the portion 16 of the pulley 15 so as to provide a further securing means for the auxiliary pulley 22. Furthermore, the jam nut prevents the securing elements 30 from backing out. The belt 28 is arranged in engagement with the outer periphery of the pulley 22, and these belts 21 and 28 can be used for receiving or transmitting power from or to any desired piece of apparatus or location. The openings 33 in the pulley 22 provide a means whereby a suitable tool such as a spanner wrench can be arranged in engagement therewith as for example when the pulley 22 is to be removed or replaced.

It will be seen that according to the present invention there has been provided an assembly wherein the pulley 22 is adapted to screw onto a standard shaft 12 in place of the regular locking nut to facilitate dual or multiple sheaving of standard pulleys. To lock the pulley 22 in place, the set screws 30 are provided which are driven into the hub 16 of the standard pulley 15, and then the jam nut 32 is replaced if possible, so as to apply a force against the thread and lock the pulley or sheave in place. By using the pulley 22 along with the pulley 15, there is provided a multiple drive from a single shaft without replacing the original pulley. As an example of the use of the present invention, the device can be used for driving an A.C. generator from the shaft of a D.C. generator.

The pulley 22 is adapted to screw onto a standard shaft on an automobile or truck generator and it screws on the shaft in place of a regular locking nut to facilitate dual or multiple sheaving of standard generator pulleys. When the pulley or sheave 22 is being locked in place, the set screws 30 are provided which are driven into the hub of the standard pulley and then the jam nut is placed onto the shaft if possible so as to apply a force against the thread and lock the pulley into place. Thus, it will be seen that the pulley will provide a multiple drive from a single shaft without replacing the original pulley, so that according to the present invention an additional pulley can be attached to the present generator without removing the original pulley. Furthermore, the present invention contemplates the use of a dual pulley on a generator for driving other equipment such as a second generator, air compressor, power tools, air conditioners or the like. Furthermore, the pulley, by replacing an existing jam nut, gives a better or more firm locking arrangement to the shaft. The invention is especially suitable for operating an A.C. generator as previously described. Furthermore, the arrangement of the present invention permits the pulley 22 to be changed quickly from one size to another so that various stages can be obtained in operating an auxiliary generator or power tool. Heretofore pulleys of this type have been of the two sheave type of pulley in which one is not detachable from the other, but with the present invention interchangeability of pulleys is possible without changing or deflecting the use of the existing pulley. The openings 33 permit a spanner wrench to be arranged in engagement therewith so that the pulley can be tightened. The set screws 30 are preferably provided with Allen heads so as to facilitate turning thereof.

The pulley of the present invention is especially suitable for transferring rotating motion from an automobile generator shaft to an auxiliary generator equipment without the necessity of replacing existing belts or pulleys. The present invention is intended to encompass any or all possible uses of adapting any auxiliary equipment requiring rotating motion to any other rotating power drive using the V-belt and pulley arrangement. Some of the examples of this are as follows: For connecting a power saw to an automobile, a welding generator to a tractor, a grinder to a lathe drive motor, a disc sander to a table saw drive motor, and an air compressor to an automobile or the like.

The present invention permits an auxiliary pulley to be mounted which provides multiple drive from a single shaft without replacing the original pulley. Heretofore it was necessary to remove and discard the existing pulley and replace the same with a dual sheave pulley, and this created excessive costs since it was necessary to add an additional pulley and the additional labor was quite costly. The present invention provides a highly simple construction which is universal in application and wherein the pulley assembly is especially useful for adapting a generator so that an additional power take-off can be provided by the pulley. In other words, the pulley 22 can be arranged in the drawings so that the belt 28 provides an additional power take-off for any desired purpose. The pulley device can be used for any kind of power take-off as for example for operating saws, paint sprayers, automobiles, tractors, appliances or the like.

The generator can be used for supplying electrical energy for any desired purpose.

Minor changes in shape, size and rearrangement of details coming within the field of invention claimed may be resorted to in actual practice, if desired.

I claim:

1. In a device of the character described, a shaft having a threaded end portion, a first pulley mounted on said shaft, a second pulley arranged contiguous to said first pulley and threadedly engaging the threaded end of said shaft, securing elements extending through said second pulley and engaging said first pulley, a jam nut engaging the threaded end of said shaft and abutting said second pulley, there being a plurality of spaced apart tool engaging openings in said second pulley.

2. In a device of the character described, a shaft having an outer threaded end portion, a first drive pulley mounted on said shaft and including a first portion provided with a central opening for the projection therethrough of said shaft, an offset second portion extending from said first portion and terminating in an outer third portion, said third portion having an annular groove therein, a belt arranged in engagement with said groove, a second drive pulley arranged adjacent the outer surface of said first pulley, said second pulley having substantially the same shape as said first pulley, and said second pulley including a first section provided with a central threaded opening which engages the threaded end portion of said shaft, said second pulley further including an offset second section which terminates in an outer third section, said third section having an annular groove therein, a belt arranged in engagement with said groove, there being a plurality of spaced apart threaded apertures in the first section of said second pulley, and securing elements extending through said threaded apertures and having pointed inner ends engaging the first portion of said first pulley.

3. The structure as defined in claim 2, and further including a jam nut arranged contiguous to the outer surface of said first section of said second pulley, and said jam nut threadedly engaging the outer end of said shaft.

4. In a device of the character described, a shaft having an outer threaded end portion, a first drive pulley mounted on said shaft and including a first portion provided with a central opening for the projection therethrough of said shaft, an offset second portion extending from said first portion and terminating in an outer third portion, said third portion having an annular groove therein, a belt arranged in engagement with said groove, a second drive pulley arranged adjacent the outer surface of said first pulley, said second pulley having substantially the same shape as said first pulley, and said second pulley including a first section provided with a central threaded opening which engages the threaded end portion of said shaft, said second pulley further including an offset second section which terminates in an outer third section, said third section having an annular groove therein, a belt arranged in engagement with said groove, there being a plurality of spaced apart threaded apertures in the first section of said second pulley, and securing elements extending through said threaded apertures and having pointed inner ends engaging the first portion of said first pulley, a jam nut arranged contiguous to the outer surface of said first section of said second pulley, and said jam nut threadedly engaging the outer end portion of said shaft, there being a plurality of spaced apart holes in the third section of said second pulley.

References Cited in the file of this patent

UNITED STATES PATENTS

| 222,220 | Wynkoop | Dec. 2, 1879 |
| 848,183 | Luke | Mar. 26, 1907 |
| 1,500,579 | Eager | July 8, 1924 |
| 2,253,591 | Travis et al. | Aug. 26, 1941 |
| 2,694,175 | Davis | Nov. 9, 1954 |